US008518551B2

(12) United States Patent
Tojo

(10) Patent No.: US 8,518,551 B2
(45) Date of Patent: Aug. 27, 2013

(54) BIAXIALLY ORIENTED POLYESTER FILM FOR AUTOMOBILE DRIVING MOTORS, AND ELECTRICALLY INSULATING MEMBER THEREFROM

(75) Inventor: Mitsuo Tojo, Gifu (JP)

(73) Assignee: Teijin Dupont Films Japan Limtied, Tokyo (JP)

( * ) Notice: Subject to any disclaimer, the term of this patent is extended or adjusted under 35 U.S.C. 154(b) by 642 days.

(21) Appl. No.: 12/601,952

(22) PCT Filed: May 29, 2008

(86) PCT No.: PCT/JP2008/059893
§ 371 (c)(1),
(2), (4) Date: Nov. 25, 2009

(87) PCT Pub. No.: WO2008/149770
PCT Pub. Date: Dec. 11, 2008

(65) Prior Publication Data
US 2010/0173140 A1    Jul. 8, 2010

(30) Foreign Application Priority Data
May 30, 2007  (JP) .................................. 2007-143342

(51) Int. Cl.
*B32B 27/08*  (2006.01)
*B32B 27/34*  (2006.01)
*B32B 27/36*  (2006.01)
*C08G 63/16*  (2006.01)
*C08G 63/18*  (2006.01)
*C08G 63/181*  (2006.01)
*C08G 63/185*  (2006.01)
*C08G 63/187*  (2006.01)
*C08G 63/189*  (2006.01)

(52) U.S. Cl.
USPC ............. 428/475.2; 428/474.4; 428/480; 428/910; 528/308

(58) Field of Classification Search
None
See application file for complete search history.

(56) References Cited

U.S. PATENT DOCUMENTS

| | | | | |
|---|---|---|---|---|
| 4,725,479 A | * | 2/1988 | Utsumi ........................ | 428/209 |
| 5,242,757 A | * | 9/1993 | Buisine et al. ................ | 428/480 |
| 5,494,739 A | * | 2/1996 | Chuujou et al. .............. | 428/323 |
| 5,618,609 A | * | 4/1997 | Chujo et al. .................. | 428/141 |
| 5,631,063 A | * | 5/1997 | Chujo et al. .................. | 428/141 |
| 5,731,071 A | * | 3/1998 | Etchu et al. .................. | 428/220 |
| 5,958,581 A | * | 9/1999 | Khanarian et al. ............ | 428/357 |
| 6,100,617 A | * | 8/2000 | Carter et al. ................... | 310/90 |
| 6,124,043 A | * | 9/2000 | Tsukamoto et al. .......... | 428/480 |
| 6,139,952 A | * | 10/2000 | Furuya et al. ................. | 428/339 |
| 6,303,228 B1 | * | 10/2001 | Watanabe et al. .......... | 428/423.7 |
| 6,309,730 B1 | * | 10/2001 | Sumi .............................. | 428/141 |
| 6,537,657 B1 | * | 3/2003 | Watanabe et al. ............. | 428/331 |
| 6,590,044 B2 | * | 7/2003 | Suzuki et al. ................. | 525/437 |
| 6,652,979 B1 | * | 11/2003 | Takahashi et al. ............ | 428/458 |
| 7,275,299 B2 | * | 10/2007 | Kuroyanagi et al. .......... | 29/596 |
| 7,335,276 B2 | * | 2/2008 | Kawka et al. ................. | 156/324 |
| 7,384,690 B2 | * | 6/2008 | Machida et al. ............. | 428/328 |
| 7,967,941 B2 | * | 6/2011 | Nakanishi et al. ............ | 156/299 |
| 2005/0064140 A1 | * | 3/2005 | Furuya et al. ................. | 428/141 |
| 2008/0000599 A1 | * | 1/2008 | Yokura et al. ................. | 162/146 |

FOREIGN PATENT DOCUMENTS

| | | | |
|---|---|---|---|
| JP | 6-335960 A | | 12/1994 |
| JP | 07-285173 A | | 10/1995 |
| JP | 07-299891 A | | 11/1995 |
| JP | 2001-076536 A | | 3/2001 |
| JP | 2002-245857 A | | 8/2002 |
| JP | 2002-273844 A | | 9/2002 |
| JP | 2005-335344 | * | 12/2005 |
| JP | 2006-130730 A | | 5/2006 |

* cited by examiner

*Primary Examiner* — Vivian Chen
(74) *Attorney, Agent, or Firm* — Sughrue Mion, PLLC

(57) ABSTRACT

An object of the invention is to provide a biaxially oriented polyester film for automobile driving motors, which has, in addition to high-temperature dimensional stability, high hydrolysis resistance required for an insulating film of an automobile driving motor, and also exhibits excellent delamination characteristics.

6 Claims, No Drawings

BIAXIALLY ORIENTED POLYESTER FILM FOR AUTOMOBILE DRIVING MOTORS, AND ELECTRICALLY INSULATING MEMBER THEREFROM

TECHNICAL FIELD

The present invention relates to a biaxially oriented polyester film for automobile driving motors and also to an electrically insulating member therefrom. More specifically, the invention relates to a biaxially oriented polyester film for automobile driving motors, having excellent heat resistance and hydrolysis resistance with excellent delamination characteristics, and also to an electrically insulating member therefrom.

BACKGROUND ART

In recent years, from the environmental point of view, there are increasing demands for automobiles to replace conventional gasoline-engine cars. In particular, hybrid cars that combine a gasoline engine with a motor to offer higher fuel efficiency, lower noise, and the like are receiving interest. Motors used in such hybrid cars are required to have extremely high output, and also, they are used in an extremely severe environment for a long period of time. Accordingly, an insulating film used in the motor is required to have high heat resistance and high hydrolysis resistance.

With the recent advent of electrical appliances and electronics with reduced size and increased performance, improvement of heat resistance, amount of oligomer extracted relative to refrigerant, hydrolysis resistance, and like characteristics of insulating films for conventional motor usage, such as those for use in motors for compressors of refrigerators, air conditioners, and the like, has been required, and various studies have been made thereon. For example, as a result of modification of heat resistance (heat-resistance class E) of a usual polyethylene terephthalate film (hereinafter referred to as PET film), a PET film with heat-resistance class B (class B PET film) has been used. Further, according to JP-A-2001-76536 (Patent Document 1), JP-A-2002-273844 (Patent Document 2), etc., a polyethylene naphthalate film (hereinafter sometimes referred to PEN film) and the like have also been in use.

A PEN film, in particular, is an insulating film of high heat-resistance class, and thus is often used by itself. Accordingly, in many cases, the film is used as a thick film having a thickness of not less than 200 μm. When such a thick PEN film is processed into an insulating material for an electrically insulating member called slot or wedge, delamination, a phenomenon that stacking (stacked structure) of molecules undergoes separation between the planes of the aromatic rings, often takes place at the time of punching or bending, accompanied by the problem of low yield.

As a method to suppress delamination during processing of a PEN film, JP-A-6-335960 (Patent Document 3), for example, has proposed a method in which the temperature for PEN film processing, the punch curvature, and the like are devised to reduce the frequency of delamination. However, employment of such a method requires improvement of the processing apparatus. In addition, in winter when atmospheric temperature and humidity are low, the effect of the method is occasionally insufficient.

Meanwhile, when a PET or PEN film conventionally used as insulating film is used as an insulating film for automobile driving motors, the performance thereof has been insufficient in terms of hydrolysis resistance.

Consequently, in order to use a PEN film as an insulating film of an automobile driving motor, there now is a demand for a biaxially oriented polyester film for automobile driving motors, having high-temperature dimensional stability, and which also has higher hydrolysis resistance than a conventional PEN film and exhibits excellent delamination characteristics.

Patent Document 1: JP-A-2001-76536
Patent Document 2: JP-A-2002-273844
Patent Document 3: JP-A-6-335960

Problem to be Solved by the Invention

An object of the invention is to provide a biaxially oriented polyester film for automobile driving motors, which has, in addition to high-temperature dimensional stability, high hydrolysis resistance required for an insulating film of an automobile driving motor, and also exhibits excellent delamination characteristics.

Means for Solving the Problem

Such an object of the invention can be achieved by a biaxially oriented polyester film for automobile driving motors, composed primarily of polyethylene naphthalenedicarboxylate. The plane orientation coefficient of the film is not less than 0.260 and not more than 0.280, the melting sub-peak temperature (Tsm) of the film is not less than 210° C. and not more than 230° C., the heat shrinkage percentages in the longitudinal direction and the transverse direction of the film after treatment at 150° C. for 30 minutes are each not less than 0% and not more than 1.0%, and the film thickness is not less than 100 μm and not more than 200 μm.

According to preferred embodiments, the biaxially oriented polyester film for automobile driving motors of the invention satisfies at least one of the following conditions: the Young's moduli in the longitudinal direction and the transverse direction are each not less than 5900 MPa, the intrinsic viscosity of the film is not less than 0.40 dl/g, and the oligomer extraction amount is not less than 0.0 wt % and not more than 0.5 wt %.

Specifically, the biaxially oriented polyester film for automobile driving motors of the invention is applicable to the driving motor of a hybrid car or an electric car.

Further, the invention encompasses an electrically insulating member for automobile driving motors, which contains the biaxially oriented polyester film for automobile driving motors.

The invention also encompasses an electrically insulating member for automobile driving motors, which comprises the biaxially oriented polyester film for automobile driving motors and meta-aramid sheets laminated to opposite sides of the biaxially oriented polyester film.

Conventionally, an increase in plane orientation coefficient of a polyethylene naphthalenedicarboxylate film is known to only improve resistance to thermal degradation. However, such an increase was found to also improve hydrolysis resistance, and the invention is based on this finding. Further, although a simple increase in plane orientation coefficient by itself allows delamination to occur, when the film is made thinner than before, this not only improves hydrolysis resistance but also suppresses delamination at the time of punching or bending; this is one feature of the invention. In addition, it was found that when the film is also provided with excellent high-temperature dimensional stability with a predetermined melting sub-peak temperature and a predetermined heat shrinkage percentage, such a film is suitable for use as an insulating film of an automobile driving motor. The invention was thus accomplished.

ADVANTAGE OF THE INVENTION

According to the invention, the biaxially oriented polyester film for automobile driving motors of the invention has, in addition to high-temperature dimensional stability, high hydrolysis resistance required for an insulating film of an automobile driving motor, and also exhibits excellent delamination characteristics. Accordingly, the film is suitable for use as an insulating film of a driving motor of a hybrid car or an electric car.

The biaxially oriented polyester film for automobile driving motors of the invention is also characterized in generating a small amount of oligomer.

BEST MODE FOR CARRYING OUT THE INVENTION

Hereinafter, the invention will be described in detail.
<Polyethylene Naphthalenedicarboxylate>

The polyester film according to the invention is composed primarily of polyethylene naphthalenedicarboxylate. Polyethylene naphthalenedicarboxylate comprises naphthalene dicarboxylic acid as a dicarboxylic acid component and ethylene glycol as a glycol component. "Primarily" as used herein means that it accounts for not less than 80 mol % of all the repeating structural units of the polymer component. In the polyethylene naphthalenedicarboxylate of the invention, not less than 80 mol % of all the repeating units preferably consist of at least one element selected from the group consisting of ethylene-2,6-naphthalenedicarboxylate, ethylene-2,7-naphthalenedicarboxylate, and ethylene-1,5-naphthalenedicarboxylate, and particularly preferably are ethylene-2,6-naphthalenedicarboxylate. It is further preferable that not less than 90 mol %, particularly preferably not less than 95 mol %, of all the repeating units are ethylene-2,6-naphthalenedicarboxylate. A substantial homopolymer of polyethylene-2,6-naphthalenedicarboxylate is particularly preferable.

The polyethylene naphthalenedicarboxylate of the invention may be a polyethylene naphthalenedicarboxylate copolymer having a copolymer component proportion of not more than 20 mol %. When polyethylene naphthalenedicarboxylate is a copolymer, a compound having in the molecule two ester-forming functional groups can be used as a copolymer component. Examples of such compounds include oxalic acid, adipic acid, phthalic acid, sebacic acid, dodecanedicarboxylic acid, isophthalic acid, terephthalic acid, 2,7-naphthalene dicarboxylic acid, 1,5-naphthalene dicarboxylic acid, 1,4-cyclohexanedicarboxylic acid, 4,4'-diphenyldicarboxylic acid, phenylindan dicarboxylic acid, tetralindicarboxylic acid, decalindicarboxylic acid, diphenyletherdicarboxylic acid, and like dicarboxylic acids; p-oxybenzoic acid, p-oxyethoxy benzoic acid, and like oxycarboxylic acids; and diethylene glycol, propylene glycol, trimethylene glycol, tetramethylene glycol, hexamethylene glycol, cyclohexanemethylene glycol, neopentyl glycol, ethylene oxide adducts of bisphenol sulfone, ethylene oxide adducts of bisphenol A, diethylene glycol, polyethylene oxide glycol, and like dihydric alcohols. These copolymer components may be used singly or in combination of two or more kinds. Among these copolymer components, preferred examples of acid components are isophthalic acid, terephthalic acid, 4,4'-diphenyldicarboxylic acid, 2,7-naphthalene dicarboxylic acid, and p-oxybenzoic acid, and preferred examples of glycol components are diethylene glycol, trimethylene glycol, hexamethylene glycol, neopentyl glycol, and ethylene oxide adducts of bisphenol sulfone.

Further, polyethylene naphthalenedicarboxylate may be one obtained by partially or completely blocking the terminal hydroxyl groups and/or carboxyl groups with benzoic acid, methoxypolyalkylene glycol, or a like monofunctional compound, or may also be one obtained by copolymerization with a small amount of glycerin, pentaerythritol, or a like trifunctional ester-forming compound within the range where a substantially linear polymer is obtained.

Polymer in the polyester film of the invention primarily comprises a homopolymer or copolymer of polyethylene naphthalenedicarboxylate, and may also be a blend with other polyesters or organic polymers other than polyesters. Incase where the polymer is such a blend, the proportion of polyethylene naphthalenedicarboxylate in the polymer component based on the polymer weight is preferably not less than 80 wt %, more preferably not less than 90 wt %, and particularly preferably not less than 95 wt %. When the polyethylene naphthalenedicarboxylate content is within such a range, the mechanical properties, long-term durability, and dimensional stability can be secured without extreme loss of the intrinsic characteristics of the polyethylene naphthalenedicarboxylate film.

Examples of polyesters that can be blended into polyethylene naphthalenedicarboxylate include polyethylene terephthalate, polyethylene isophthalate, polytrimethylene terephthalate, polyethylene-2,7-naphthalenedicarboxylate, polytrimethylene-2,6-naphthalenedicarboxylate, polyneopentylene-2,6-naphthalenedicarboxylate, and poly(bis(4-ethyleneoxyphenyl)sulfone)-2,6-naphthalenedicarboxylate. Among these, polyethylene isophthalate, polytrimethylene terephthalate, polytrimethylene-2,6-naphthalenedicarboxylate, and poly(bis(4-ethyleneoxyphenyl)sulfone)-2,6-naphthalenedicarboxylate are preferable. These polyesters or other organic polymers may be used singly or in combination of two or more kinds.

The polyethylene naphthalenedicarboxylate of the invention can be produced by reacting dicarboxylic acid with glycol to directly give a low-polymerization-degree polyester, and then further polymerizing the low-polymerization-degree polyester in the presence of a polymerization catalyst to give polyester. The polyethylene naphthalenedicarboxylate of the invention may also be produced by subjecting a dicarboxylic acid lower alkyl ester and glycol to transesterification reaction to give a low-polymerization-degree polyester, and then further polymerizing the low-polymerization-degree polyester in the presence of a polymerization catalyst to give polyester.

One or more compounds containing sodium, potassium, magnesium, calcium, zinc, strontium, titanium, zirconium, manganese, or cobalt, for example, may be used as transesterification catalysts for transesterification reaction. Examples of polymerization catalysts include antimony trioxide, antimony pentoxide, and like antimony compounds; germanium dioxide and like germanium compounds; tetraethyl titanate, tetrapropyl titanate, tetraphenyl titanate, and partial hydrolysates thereof; and ammonium titanyl oxalate, potassium titanyl oxalate, titanium trisacetylacetonate, and like titanium compounds.

When polymerization is carried out after transesterification reaction, a phosphorus compound, such as trimethyl phosphate, triethyl phosphate, tri-n-butyl phosphate, triethyl phosphonoacetate, orthophosphoric acid, or the like, may be added prior to the polymerization in order to deactivate the transesterification catalyst(s). The content of phosphorus element in the polyethylene naphthalenedicarboxylate is preferably not less than 20 ppm and not more than 100 ppm in terms of thermal stability of the polyester.

In addition, the polyethylene naphthalenedicarboxylate may also be processed into chips after melt polymerization and then subjected to solid-phase polymerization in a range from the glass transition temperature of the polyethylene naphthalenedicarboxylate or more to the melting point temperature thereof or less under reduced pressure or in a stream of nitrogen or a like inert gas.

<Additive>

In order to increase the handleability of the film, the biaxially oriented polyester film of the invention may contain inert particles and the like within the range to retain the full advantage of the invention. Examples of such inert particles include inorganic particles containing the elements of group IIA, IIB, IVA, or IVB of the periodic table (e.g., kaolin, alumina, titanium oxide, calcium carbonate, silicon dioxide, etc.) and microparticles of polymer with high heat resistance, such as particles of cross-linked silicone resin, cross-linked polystyrene, cross-linked acrylic resin, etc. In case where inert particles are contained, the mean particle diameter of the inert particles is preferably 0.001 to 5 μm, and the proportion thereof based on the total film weight is preferably 0.01 to 10 wt %, and more preferably 0.05 to 5 wt %. If necessary, the biaxially oriented polyester film of the invention may also contain a small amount of ultraviolet absorber, antioxidant, antistatic agent, light stabilizer, and thermostabilizer.

<Plane Orientation Coefficient>

The biaxially oriented polyester film of the invention has a plane orientation coefficient (ns) of not less than 0.260 and not more than 0.280. Plane orientation coefficient is determined from the refractive indexes in the longitudinal direction (hereinafter sometimes referred to as length direction, film production direction, or MD direction), the transverse direction (hereinafter sometimes referred to as width direction or TD direction), and the thickness direction of the film. The plane orientation coefficient of the film is preferably not less than 0.261, and more preferably not less than 0.262. Meanwhile, the plane orientation coefficient of the film is preferably not more than 0.279, and more preferably not more than 0.278. The plane orientation coefficient herein is expressed as a value calculated by the following equation (1) using the refractive index of each direction component of the film measured by Abbe's method:

$$ns=(nMD+nTD)/2-nZ \quad (1)$$

wherein nMD represents the refractive index in the MD direction of the film, nTD represents the refractive index in the TD direction of the film, and nZ represents the refractive index in the thickness direction of the film, which is perpendicular to the film plane.

Plane orientation coefficient of a film can be regarded as an index that shows the orientation state of molecular chains in the film. The invention is based on the novel finding that when the plane orientation coefficient of the film is made higher than before, hydrolysis resistance is improved. On one hand, when the plane orientation coefficient of the film exceeds the upper limit, the orientation of molecular chains is too strong, and even when the film thickness is within the range of the invention, delamination occurs during punching or bending, resulting in low yield. On the other hand, when the plane orientation coefficient is below the lower limit, the plain orientation of molecular chains is insufficient, and the hydrolysis-resistance-improving effect is not pronounced.

Specifically, such film plane orientation coefficient can be achieved when stretching is performed at a draw ratio of 3.7 to 4.7 independently both in the longitudinal direction and the transverse direction, and heat set is performed at a heat set temperature of 215 to 235° C. The difference between the longitudinal draw ratio and the transverse draw ratio is preferably not more than 0.3.

<Melting Sub-Peak Temperature (Tsm)>

The melting sub-peak temperature (Tsm) of the biaxially oriented polyester film of the invention is preferably not less than 210° C. and not more than 230° C. The melting sub-peak temperature (Tsm) is preferably not less than 215° C., more preferably not less than 220° C., and still more preferably not less than 222° C. Meanwhile, the melting sub-peak temperature (Tsm) is preferably not more than 229° C., and more preferably not more than 228° C.

The biaxially oriented polyester film of the invention is occasionally used in a high temperature environment, and thus is required to have high-temperature dimensional stability at 150° C. In order to obtain a film with such a characteristic, after stretching the film, the film is subjected to heat set to crystallize the film. The crystallization by heat set leads to development of a melting sub-peak. However, when the heat set temperature is increased to approach the melting point of polyethylene naphthalenedicarboxylate, the previously formed molecular orientation is weakened, which leads to reduction of plane orientation coefficient, i.e., reduction of hydrolysis resistance. Therefore, the melting sub-peak temperature is required not to exceed the upper limit. When the melting sub-peak temperature is below the lower limit, strain due to stretching is not sufficiently relaxed, whereby delamination occurs during punching or bending, and also the heat shrinkage percentage tends to be high.

The above-defined melting sub-peak temperature range is achieved by adjusting the heat set temperature in the film production process. More specifically, such a range is achieved when heat set is performed at a film temperature of not less than 215° C. and not more than 235° C.

<Heat Shrinkage Percentage>

Because an automobile driving motor is used in a high temperature environment, the biaxially oriented polyester film of the invention is required to have a heat shrinkage percentage of not less than 0% and not more than 1.0%, preferably not more than 0.8%, independently both in the longitudinal direction and the transverse direction after heat treatment at 150° C. for 30 minutes. When the heat shrinkage percentage exceeds the upper limit, the film easily undergoes contraction at a portion exposed to a temperature of not less than 150° C., causing local strain. Consequently, as an insulating member, such as a slot or a wedge, deformation occurs during use. This affects the insulation performance, and shortens the motor life. Further, when laminated with aramid sheets, the difference in shrinkage at 150° C. between such a film and the aramid sheet is large. This results in the local wrinkle formation in the aramid sheets or the occurrence of separation between the aramid sheets and the biaxially oriented polyester film, and the insulation performance may be affected thereby. Within the above range, a lower heat shrinkage percentage is preferred. However, in order to obtain sufficient plane orientation coefficient, moderate stretching is necessary. Therefore, the heat shrinkage percentages in the longitudinal direction and the transverse direction are each usually not less than 0%, preferably not less than 0.2%, and more preferably not less than 0.4%.

Such heat shrinkage percentage can be achieved when stretching is performed at a draw ratio of not more than 4.7 independently both in the longitudinal direction and the transverse direction, and, after heat set at a temperature of not less than 215° C., thermal relaxation is performed at 185 to 205°

C. The draw ratio may be reduced within such a range to reduce heat shrinkage percentage, and is preferably 3.7 to 4.7.

<Film Thickness>

The thickness of the biaxially oriented polyester film of the invention needs to be not less than 100 μm and not more than 200 μm. The thickness of the biaxially oriented polyester film of the invention is preferably not less than 105 μm, and more preferably not less than 110 μm. Meanwhile, the thickness of the biaxially oriented polyester film of the invention is preferably not more than 180 μm, more preferably not more than 175 μm, and particularly preferably not more than 150 μm.

In the case where the film thickness is below the lower limit, when the film is used in a slot or a wedge of an automobile driving motor or for phase-to-phase insulation, the strength and the insulation capability of the member itself may be insufficient. In particular, such a member is mounted on an automobile and thus is required to have sufficient strength to withstand impact, so a certain amount of thickness is necessary.

On the other hand, in the case where the film thickness exceeds the upper limit, when the film has the plane orientation coefficient of the invention, it easily undergoes delamination during bending, giving low yield. The biaxially oriented polyester film of the invention is characterized in having high plane orientation coefficient and thus exhibiting excellent hydrolysis resistance. However, polyethylene naphthalenedicarboxylate has the property that, in case of a thick film, a higher plane orientation coefficient leads to a higher likelihood of delamination. Therefore, with respect to the thickness of the biaxially oriented polyester film of the invention, within the above-defined range, the thinner the better.

<Young's Modulus>

The Young's moduli in the longitudinal direction and transverse direction of the biaxially oriented polyester film of the invention are each preferably not less than 5900 MPa, and more preferably not less than 6000 MPa. As with plane orientation coefficient, Young's modulus also depends on the orientation of molecular chains. Therefore, Young's modulus increases with an increase in plane orientation coefficient.

In the case where the Young's modulus is below the lower limit, the lower limit of plane orientation coefficient is not satisfied either. Accordingly, the hydrolysis-resistance-improving effect is not sufficiently pronounced. Further, in the case where the Young's modulus is below the lower limit, when a film having the thickness of the invention is used as an electrically insulating member for automobile driving motors, the strength of the member may not be sufficiently retained.

A higher Young's modulus leads to a stronger member, so no upper limit is set. However, when Young's modulus is not less than 7000 MPa, film breakage may often occur during the film production process. In addition, the orientation of molecular chains may be too strong, whereby delamination easily occurs even when the film thickness is within the range of the invention, resulting in low yield.

Specifically, such Young's modulus can be achieved in the same manner as in the achievement of the plane orientation coefficient.

<Intrinsic Viscosity>

After processed into a biaxially oriented film, the film preferably has an intrinsic viscosity of not less than 0.40 dl/g, and more preferably not less than 0.45 dl/g. Although no upper limit is set, when the intrinsic viscosity exceeds 0.90 dl/g, extremely high torque is exerted on the screw of melt extruder, and it thus becomes difficult to use an ordinary melting extruder. The intrinsic viscosity of a film herein is intrinsic viscosity of the polymer that forms the film. After processed into a biaxially oriented film, the intrinsic viscosity of the film is preferably not more than 0.80 dl/g, more preferably not more than 0.75 dl/g, in terms of load on the screw at the time of film production.

The invention is characterized in that although the intrinsic viscosity of the film is within the range normally employed, the plane orientation coefficient of the film is made higher to thereby achieve high hydrolysis resistance. However, when the intrinsic viscosity is below the lower limit, the initial strength of the film itself may be low. Intrinsic viscosity is expressed as a value (unit: dl/g) measured at 35° C. using o-chlorophenol as the solvent.

The intrinsic viscosity of polyethylene naphthalenedicarboxylate before processed into a film is preferably not less than 0.50 dl/g, and more preferably not less than 0.55 dl/g. When the intrinsic viscosity of polyethylene naphthalenedicarboxylate before processed into a film is below the lower limit, after melt extrusion and subsequent biaxial orientation, the intrinsic viscosity of the obtained film may not reach the above-defined range.

<Oligomer Extraction Amount>

The biaxially oriented polyester film of the invention preferably has an oligomer extraction amount of not less than 0.0 wt % and not more than 0.5 wt %. The oligomer extraction amount herein is determined as follows. A 38 mm×38 mm film is boiled in 20 cc of 139° C. xylene for 2 hours, annealed, and then removed. Subsequently, the amount of oligomer in the xylene is determined from the absorbance at a measured wavelength of 240 nm. The oligomer extraction amount is expressed as the thus-obtained value. An oligomer extraction amount exceeding 0.5 wt % causes the problem in that when the film is used under high temperature conditions while the driving motor is immersed in oil, oligomer extracted from the film often precipitates in oil, making the film unusable as an insulating film of an automobile driving motor. Within the range of not more than 0.5 wt %, a smaller oligomer extraction amount is preferred. In order to achieve such oligomer extraction amount, it is preferable that the plane orientation coefficient of the film is within the desired range, and the oligomer extraction amount can be achieved in the same manner as in the achievement of plane orientation coefficient. In addition, solid phase polymerization enables further reduction.

<Film Production Method>

The biaxially oriented polyester film of the invention can be produced using any of publicly known film production methods, as long as biaxial stretching is included. The film can be produced by a method, for example, in which fully dried polyethylene naphthalenedicarboxylate is melted and extruded at the melting point to (melting point+70).° C., and then rapidly cooled on a casting drum to give an unstretched film. Subsequently, the unstretched film is biaxially stretched successively or simultaneously, and then thermally fixed. When the film is produced by successive biaxial stretching, the unstretched film is stretched in the longitudinal direction 3.7 to 4.7 times the original length at 130 to 170° C., and then stretched in the transverse direction 3.7 to 4.7 times the original length at 130 to 150° C. using a stenter. The draw ratio is preferably 3.9 to 4.6 independently both in the longitudinal direction and the transverse direction. The difference between the longitudinal draw ratio and the transverse draw ratio is preferably not more than 0.3. Heat set is performed at a temperature of not less than 215° C. and not more than 235° C. under tension or restricted shrinkage. The heat set time is preferably 1 to 1000 seconds. The heat set temperature is preferably not less than 220° C., more preferably not less than 225° C., and particular preferably 227° C. Meanwhile, the heat set temperature is preferably not more than 234° C., more preferably not more than 233° C. The above draw temperature, draw ratio, heat set temperature, and the like are applicable also in the case of simultaneous biaxial stretching.

Further, after heat set, relaxation is performed at a temperature of 185 to 205° C., thereby giving a film having the heat shrinkage percentage of the invention.

<Automobile Driving Motor Usage>

The biaxially oriented polyester film of the invention has, in addition to high-temperature dimensional stability, high hydrolysis resistance recently required for an insulating film of an automobile driving motor, and also exhibits excellent delamination characteristics. Accordingly, the film is suitable for use as an insulating film of a driving motor of a hybrid car or an electric car. In particular, the film can be used in a slot or a wedge of an automobile driving motor and also for phase-to-phase insulation. For such usages, insulation performance and shape stability are required, so a thick film is desired. In particular, such a member is mounted on an automobile and thus is required to have sufficient strength to withstand impact, so a thickness of not less than 100 µm is necessary. The biaxially oriented polyester film of the invention has the above performance and can also be processed into a film having a thickness of not less than 100 µm by an ordinary film production method. In this respect, as compared with other materials, the film is more suitable as an insulating film of an automobile driving motor.

The invention also encompasses an electrically insulating member for automobile driving motors, which contains the biaxially oriented polyester film as an insulating film. Specific examples of electrically insulating members of an automobile driving motor include the above-mentioned slot, wedge, and correlated insulating member.

The electrically, insulating member may has a three-layered structure, for example, having the biaxially oriented polyester film of the invention and two meta-aramid sheets laminated to opposite sides thereof.

Aramid usually means wholly aromatic polyamide in which not less than 85 mol % of the amide bonds are directly linked to the two aromatic rings. Meta-aramid herein is a polymer obtained by polycondensation of meta-oriented aromatic diamine and meta-oriented aromatic dicarboxylic halide, and is also a polymer obtained by polycondensation of para-oriented aromatic diamine, para-oriented aromatic dihalide, aliphatic diamine, aliphatic dicarboxylic acid, and the like at a copolymerization ratio of not more than 40 mol % relative to the above-mentioned monomer. It also is a polymer of having the repeating units linked by amide bonds at the meta position of the aromatic ring or in a similar manner.

The meta-aramid sheet of the invention preferably has a thickness of 10 to 100 µm, more preferably 20 to 80 µm, and particularly preferably 30 to 70 µm.

Meta-aramid sheets have excellent heat resistance, strength, and voltage resistance, and thus can be laminated to opposite sides of the biaxially oriented polyester film of the invention to serve as heat-resistant insulating paper, which can further improve the characteristics of the electrically insulating member. Further, when meta-aramid sheets are laminated to opposite sides of the biaxially oriented polyester film of the invention, the biaxially oriented polyester film itself can be further thinner. It is accordingly possible to increase the plane orientation coefficient within the film thickness range where delamination does not occur, whereby excellent hydrolysis resistance can be pronounced.

Meanwhile, use of meta-aramid sheets by themselves may cause a decrease in strength or insulation performance at the time of water absorption. Further, due to the nature of polymer, a large film thickness is difficult to achieve, so a single use of such a sheet as an electrically insulating member of an automobile driving motor is difficult.

The biaxially oriented polyester film of the invention and the meta-aramid sheets may be also laminated through an adhesive. The adhesive is not limited, and may be a urethane-based adhesive or an acryl-based adhesive, for example.

EXAMPLES

Hereinafter, the present invention will be described in further detail with reference to the examples. However, the invention is not limited to these examples. The characteristic values were measured by the below-mentioned methods. Unless otherwise noted, "part(s)" and "%" in the examples mean "part(s) by weight" and "% by weight", respectively.

(1) Plane Orientation Coefficient (ns)

Using an Abbe refractometer with the sodium D-line (589 nm) as a light source, the refractive indexes in the longitudinal direction, the transverse direction, and the thickness direction of the obtained biaxially oriented film were measured, and the plane orientation coefficient (ns) of the film was calculated by the following equation (1):

$$ns=(nMD+nTD)/2-nZ \qquad (1)$$

wherein nMD represents the refractive index in the MD direction of the film, nTD represents the refractive index in the TD direction of the film, and nZ represents the refractive index in the thickness direction of the film, which is perpendicular to the film plane.

(2) Melting Sub-Peak Temperature (Tsm)

Using DSC220 manufactured by Seiko Instruments and Electronics, a DSC curve was obtained at a temperature increase rate of 20° C./min. Two peaks, a clear endothermic peak due to melting and an endothermic peak on the low-temperature side thereof, were observed, and the endothermic peak on the low-temperature side of the clear endothermic peak due to melting was defined as melting sub-peak temperature (Tsm).

When the melting sub-peak was close to the crystal melting peak and was not a clear peak, the point where the secondary differential curve of the DSC curve crosses 0 was taken as the sub-peak temperature.

(3) Heat Shrinkage Percentage

A biaxially oriented film with the longitudinal direction and the transverse direction thereof being marked, having an accurately measured dimension of 30 cm×30 cm, is placed into an oven set at 150° C. under no load, left to stand for 30 minutes, and then removed. After the temperature decreases to room temperature, dimensional change thereof is observed. From the length ($L_0$) before heat treatment and the amount of dimensional change after heat treatment ($\Delta L$), the heat shrinkage percentages in the longitudinal direction and that in the transverse direction were determined using the following equation (2). The heat shrinkage percentage in each direction was evaluated using five samples (n=5), and the mean value thereof was employed.

$$\text{Heat shrinkage percentage (\%)}=(\Delta L/L_0)\times 100 \qquad (2)$$

(4) Film Thickness

Using an intermittent thickness meter, the thickness was measured at arbitrary 50 points along the film width direction and also at arbitrary 50 points near the width center along the film length direction. The mean value of the thickness values of 100 points was defined as film thickness.

(5) Young's Modulus

Using Tensilon UCT-100 manufactured by Orientec, in a room under controlled conditions of a temperature of 20° C.

and a humidity of 50%, a biaxially oriented film is cut into a sample with a width of 10 mm and a length of 15 cm, and then stretched at a chuck interval of 100 mm, a draw rate of 10 mm/min, and a chart speed of 500 mm/min. From the tangent at the rising part of the obtained load-elongation curve, the Young's modulus is calculated. The Young's modulus in the longitudinal direction is obtained from measurement in the longitudinal direction of the film, and the Young's modulus in the transverse direction is obtained from measurement in the transverse direction of the film. Each Young's modulus value is the mean of the results of 10 measurements.

(6) Intrinsic Viscosity

Intrinsic viscosity was measured at 35° C. using o-chlorophenol as the solvent (unit: dl/g). For the intrinsic viscosity of the film, the biaxially oriented film was sampled.

(7) Oligomer Extraction Amount

A biaxially oriented film (38 mm×38 mm) is boiled in 20 cc of 139° C. xylene for 2 hours, annealed, and then removed. The amount of oligomer in the xylene is determined from the absorbance at a measured wavelength of 240 nm. With respect to the relation between the concentration of oligomer and the absorbance, a calibration curve was prepared in advance and used. Absorbance was measured using a UV-VIS-NIR spectrophotometer "UV-3101PC" manufactured by SHIMADZU.

(8) Hydrolysis Resistance

A biaxially oriented film is cut 150 mm in the longitudinal direction and 10 mm in the transverse direction. The thus-obtained strip test piece is left for 200 hours in an environment tester set at 121° C./2 atm/100% RH (wet saturation). The test piece was hung using a stainless steel clip. The test pieces were removed in 200 hours and the breaking elongation of each test piece was measured (n=5). Taking the value before treatment as 100%, the percentage (retention) was determined. The hydrolysis resistance was evaluated according to the following criteria.

In a room under controlled conditions of a temperature of 20° C. and a humidity of 50%, the breaking elongation was measured using Tensilon UCT-100 manufactured by Orientec, by drawing a test piece to breakage at a chuck interval of 100 mm and a draw rate of 100 mm/min.

A: Breaking elongation retention of not less than 50%

B: Breaking elongation retention of not less than 20% and less than 50%

C: Breaking elongation retention of not more than 20%

(9) Delamination Property (Delamination Resistance)

A film sample was cut to a size of 80×80 mm, and, while being folded into two, the cut sample was sandwiched between a pair of flat metal plates, and then pressed by a pressing machine with a pressure of 0.3 kg/cm²G for 30 minutes. After pressing, the folded film sample was returned to the original flat state, and the length (mm) of the resulting whitened part was measured (n=5).

A mean value was obtained from the sum of the lengths (mm) of parts whitened due to pressing (n=5), and, using the equation (3), the percentage thereof relative to the total length of the fold (80 mm) was defined as fold delamination percentage (%). The delamination property was evaluated according to the following criteria.

Fold delamination percentage (%)=(length of whitened part (mm)/80 mm)×100    (3)

A: Fold delamination percentage of less than 40%

B: Fold delamination percentage of not less than 40% and Less than 70%

C: Fold delamination percentage of not less than 70%

(10) Workability Evaluation

Using the wedge-forming portion of a motor machine manufactured by Odawara Engineering, a 50-μm-thick meta-aramid sheet (manufactured by Dupont, trade name: Nomex) was attached to each side of a 125-μm-thick film sample using an acryl-based adhesive, thereby giving a laminated film. Using the laminated film, wedges having a width of 12 mm and a length of 60 mm were manufactured in an atmosphere of 25° C. and 50% RH at a processing speed of two products/sec. The obtained wedges were visually observed. Those showing polyester film delamination (including interlayer delamination) were classified as defective, and defective rate was determined. The workability was evaluated according to the following criteria. The number of products manufactured is 20 for each sample.

A: Defective rate of not more than 5%

B: Defective rate of more than 5%.

Example 1

One hundred parts by weight of dimethyl 2,6-naphthalenedicarboxylate, 60 parts by weight of ethylene glycol, as a transesterification catalyst 0.03 parts by weight of manganese acetate tetrahydrate, and as lubricants 0.10 wt % spherical silica particles having a mean particle diameter of 0.3 μm and 0.15 wt % spherical silica particles having a mean particle diameter of 0.12 μm were mixed. The mixture was subjected to transesterification reaction in the usual manner. The amount of each lubricant shows the proportion relative to the film weight. Then, 0.042 parts by weight of triethyl phosphonoacetate was added to substantially halt the transesterification reaction. Subsequently, 0.024 parts by weight of antimony trioxide was added, and continuously subjected to polymerization reaction at high temperature under high vacuum in the usual manner, thereby giving chips of polyethylene-2,6-naphthalenedicarboxylate (hereinafter sometimes referred to as PEN chips) having an intrinsic viscosity of 0.65 dl/g. The PEN chips were dried at 175° C. for 5 hours, then fed into an extruder, melted at a temperature of 300° C., extruded from a die slit, and then cooled and solidified on a casting drum set to a surface temperature of 55° C., thereby giving an unstretched film.

The unstretched film was stretched in the longitudinal direction (lengthwise direction) 4.0 times the original length at 140° C. to give a uniaxially stretched film. Subsequently, the film was subjected to successive biaxial stretching in the transverse direction (width direction) 4.1 times the original length at 135° C., and then to heat set at a heat set temperature of 230° C. for 10 seconds. The film was then subjected to reheat treatment (thermal relaxation) at 195° C. while being contracted 0.5% in the width direction to give a biaxially oriented polyester film having a thickness of 125 p.m. The obtained film was wound into a roll. The characteristics of the obtained biaxially oriented polyester film are shown in Table 1. The film had sufficient plane orientation coefficient, melting sub-peak temperature, and high-temperature dimensional stability to be used for automobile driving motors, and also exhibited excellent hydrolysis resistance and delamination characteristics. In addition, the amount of extracted oligomer was small.

Example 2

The same operation as in Example 1 was performed, except that the draw ratio in the longitudinal direction was 4.2 and the draw ratio in the transverse direction was 4.5, thereby giving a biaxially oriented polyester film having a thickness of 125 μm. The characteristics of the obtained biaxially oriented polyester film are shown in Table 1.

Example 3

Chips of polyethylene-2,6-naphthalenedicarboxylate having an intrinsic viscosity of 0.65 dl/g were packed into a tumbler, and dried at 150° C. for 6 hours while reducing the pressure to 1 mmHg. Subsequently, the temperature in the tumbler was increased to 240° C., and the temperature was maintained for 26 hours to give solid-phase-polymerized PEN chips having an intrinsic viscosity of 0.85 dl/g. Except for the above, the same operation as in Example 1 was performed, thereby giving a biaxially oriented polyester film having a thickness of 125 μm. The characteristics of the obtained biaxially oriented polyester film are shown in Table 1.

Example 4

The same operation as in Example 1 was performed, except that the draw ratio in the longitudinal direction was 4.1 and the draw ratio in the transverse direction was 4.3, thereby giving a biaxially oriented polyester film having a thickness of 125 μm. The characteristics of the obtained biaxially oriented polyester film are shown in Table 1.

Example 5

The same operation as in Example 1 was performed, except that the heat set temperature was 220° C., thereby giving a biaxially oriented polyester film having a thickness of 125 μm. The characteristics of the obtained biaxially oriented polyester film are shown in Table 1.

Example 6

The same operation as in Example 1 was performed, except that the film thickness was 150 μm. The characteristics of the obtained biaxially oriented polyester film are shown in Table 1.

Example 7

The same operation as in Example 1 was performed, except that the draw ratio in the longitudinal direction was 3.7 and the draw ratio in the transverse direction was 3.8, thereby giving a biaxially oriented polyester film having a thickness of 125 μm. The characteristics of the obtained biaxially oriented polyester film are shown in Table 1.

Comparative Example 1

The same operation as in Example 1 was performed, except that the draw ratio in the longitudinal direction was 4.5 and the draw ratio in the transverse direction was 4.8, thereby giving a biaxially oriented polyester film having a thickness of 125 μm. The characteristics of the obtained biaxially oriented polyester film are shown in Table 1.

Comparative Example 2

The same operation as in Example 1 was performed, except that the draw ratio in the longitudinal direction was 3.2 and the draw ratio in the transverse direction was 3.4, thereby giving a biaxially oriented polyester film having a thickness of 125 μm. The characteristics of the obtained biaxially oriented polyester film are shown in Table 1.

Comparative Example 3

The same operation as in Example 1 was performed, except that the heat set temperature was 240° C., thereby giving a biaxially oriented polyester film having a thickness of 125 μm. The characteristics of the obtained biaxially oriented polyester film are shown in Table 1.

Comparative Example 4

The same operation as in Example 1 was performed, except that the heat set temperature was 210° C., thereby giving a biaxially oriented polyester film having a thickness of 125 μm. The characteristics of the obtained biaxially oriented polyester film are shown in Table 1.

Comparative Example 5

The same operation as in Example 1 was performed, except for that thermal relaxation was not performed, thereby giving a biaxially oriented polyester film having a thickness of 125 μm. The characteristics of the obtained biaxially oriented polyester film are shown in Table 1.

Comparative Example 6

The same operation as in Example 1 was performed, except that the film thickness was 250 μm. The characteristics of the obtained biaxially oriented polyester film are shown in Table 1.

TABLE 1

| | Plane orientation coefficient (ns) [—] | Melting sub-peak temperature (Tsm) [° C.] | Young's modulus (MD/TD) [MPa] | Intrinsic viscosity [dl/g] | Oligomer extraction amount [wt %] | Heat shrinkage percentage (MD/TD) [%] | Evaluation of hydrolysis resistance | Evaluation of delamination property | Evaluation of workability |
|---|---|---|---|---|---|---|---|---|---|
| Ex. 1 | 0.265 | 225 | 6100/6200 | 0.55 | 0.1 | 0.5/0.6 | A | A | A |
| Ex. 2 | 0.275 | 225 | 6300/6500 | 0.55 | 0.1 | 0.7/0.8 | A | A | A |
| Ex. 3 | 0.263 | 225 | 6000/6100 | 0.70 | 0.05 | 0.6/0.7 | A | A | A |
| Ex. 4 | 0.270 | 225 | 6200/6300 | 0.55 | 0.1 | 0.6/0.7 | A | A | A |
| Ex. 5 | 0.266 | 215 | 6100/6200 | 0.55 | 0.1 | 0.6/0.7 | A | A | A |
| Ex. 6 | 0.265 | 225 | 6100/6200 | 0.55 | 0.1 | 0.5/0.6 | A | A | A |
| Ex. 7 | 0.262 | 225 | 6000/6100 | 0.55 | 0.1 | 0.4/0.5 | B | A | A |
| Comp. Ex. 1 | 0.285 | 225 | 7000/7200 | 0.55 | 0.1 | 0.9/1.0 | A | C | B |
| Comp. Ex. 2 | 0.258 | 225 | 5800/6000 | 0.55 | 0.1 | 0.3/0.4 | C | A | A |
| Comp. Ex. 3 | 0.262 | 235 | 6000/6100 | 0.55 | 0.1 | 0.3/0.4 | C | A | A |
| Comp. Ex. 4 | 0.274 | 205 | 6150/6300 | 0.55 | 0.1 | 0.6/0.8 | A | C | B |

TABLE 1-continued

| | Plane orientation coefficient (ns) [—] | Melting sub-peak temperature (Tsm) [° C.] | Young's modulus (MD/TD) [MPa] | Intrinsic viscosity [dl/g] | Oligomer extraction amount [wt %] | Heat shrinkage percentage (MD/TD) [%] | Evaluation of hydrolysis resistance | Evaluation of delamination property | Evaluation of workability |
|---|---|---|---|---|---|---|---|---|---|
| Comp. Ex. 5 | 0.265 | 225 | 6100/6200 | 0.55 | 0.1 | 0.5/2.5 | A | A | A |
| Comp. Ex. 6 | 0.265 | 225 | 6100/6200 | 0.55 | 0.1 | 0.5/0.6 | A | C | B |

INDUSTRIAL APPLICABILITY

The biaxially oriented polyester film for automobile driving motors of the invention has, in addition to high-temperature dimensional stability, high hydrolysis resistance required for an insulating film of an automobile driving motor, and also exhibits excellent delamination characteristics. Accordingly, the film is suitable for use as an insulating film of a driving motor of a hybrid car or an electric car.

The invention claimed is:

1. A biaxially oriented polyester film for automobile driving motors, composed primarily of polyethylene naphthalenedicarboxylate and characterized in that the plane orientation coefficient of the film is not less than 0.260 and not more than 0.280, the melting sub-peak temperature (Tsm) of the film is not less than 210° C. and not more than 230° C., the heat shrinkage percentages in the longitudinal direction and the transverse direction of the film after treatment at 150° C. for 30 minutes are each not less than 0% and not more than 1.0%, and the film thickness is not less than 100 μm and not more than 200 μm,
wherein the Young's moduli in the longitudinal direction and the transverse direction of the film are each not less than 6000 MPa and less than 7000 MPa.

2. A biaxially oriented polyester film for automobile driving motors according to claim 1, wherein the intrinsic viscosity of the film is not less than 0.40 dl/g.

3. A biaxially oriented polyester film for automobile driving motors according to claim 1, wherein the oligomer extraction amount of the film is not less than 0.0 wt % and not more than 0.5 wt %.

4. A biaxially oriented polyester film for automobile driving motors according to claim 1, wherein the automobile is a hybrid car or an electric car.

5. An electrically insulating member for automobile driving motors, containing a biaxially oriented polyester film for automobile driving motors according to claim 1.

6. An electrically insulating member for automobile driving motors, comprising a biaxially oriented polyester film for automobile driving motors according to claim 1 and meta-aramid sheets laminated to opposite sides of the biaxially oriented polyester film.

* * * * *